United States Patent
Takahashi (10) Patent No.: US 7,545,404 B2
(45) Date of Patent: Jun. 9, 2009

(54) VIDEOPHONE AND VIDEOPHONE SYSTEM

(75) Inventor: Katsunori Takahashi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 582 days.

(21) Appl. No.: 11/439,534

(22) Filed: May 23, 2006

(65) Prior Publication Data

US 2007/0040896 A1 Feb. 22, 2007

(30) Foreign Application Priority Data

May 27, 2005 (JP) ............................. 2005-154789

(51) Int. Cl.
*H04N 7/14* (2006.01)

(52) U.S. Cl. .................................. 348/14.02; 348/14.05

(58) Field of Classification Search .............. 348/14.02, 348/14.05, 14.01, 14.12
See application file for complete search history.

(56) References Cited

U.S. PATENT DOCUMENTS

| | | | | |
|---|---|---|---|---|
| 5,148,153 A | * | 9/1992 | Haymond | 348/14.02 |
| 5,327,576 A | | 7/1994 | Uddenfeldt et al. | |
| 6,122,682 A | * | 9/2000 | Andrews | 710/65 |
| 2005/0146600 A1 | * | 7/2005 | Chipchase et al. | 348/14.02 |

* cited by examiner

*Primary Examiner*—Stella L Woo
(74) *Attorney, Agent, or Firm*—Brinks Hofer Gilson & Lione (57) ABSTRACT

A videophone includes a videophone unit, a movement determining section, and a notifying section. By notifying, with the notifying section, a different videophone associated with a communicating party that the videophone unit is moving, the videophone unit receives, from the different videophone at the communicating party, data having an image frame rate lowered less than an image frame rate obtained when the videophone unit is stationary and having an audio error resilience level raised greater than an audio error resilience level obtained when the videophone unit is stationary.

24 Claims, 4 Drawing Sheets

IN TRAVELING OF VEHICLE OF
COMMUNICATING PARTY

FIG. 5

AT STOP OF VEHICLE OF
COMMUNICATING PARTY

VIDEOPHONE AND VIDEOPHONE SYSTEM

BACKGROUND OF THE INVENTION

1. Technical Field of the Invention

The present invention relates to videophones and videophone systems, and, in particular, to a videophone and videophone system suitable for use in performing videophone communication with a different videophone at a communicating party's location in such a manner that data including audio and images is transmitted and received between the videophone and the different videophone at the communicating party.

2. Description of the Related Arts

Among videophones provided in apparatuses such as 3G (third-generation) cellular phone apparatuses, including "FOMA" and "vodafone" models available in Japan, mutual connection has been performed in accordance with the standard 3G-324M established in the 3GPP (Third Generation Partnership Project).

According to the H.245 system message defined in the standard 3G-324M, alternative settings are possible such as an alteration in image frame rate during videophone communication and an alteration in error resilience level (see, for example, Japanese Unexamined Patent Application Publication No. 2004-32589).

On-vehicle videophones are designed so as not to display images while the vehicles are traveling since the displayed images hinder the driving of the vehicles.

However, in normal communication with a videophone, images are always transferred from a different videophone associated with a communicating party.

Accordingly, a problem occurs in that images which are not displayed during communication actually become wasted.

Also, a problem of deterioration in sound quality occurs since, in general, a data-transfer error rate increases while a vehicle provided with the videophone travels.

To eliminate the problem of deterioration in sound quality, it is possible that the error resilience level be raised while the vehicle travels.

However, by simply raising the error resilience level, the bit rate required for error resilience in multiplex data having a fixed bit rate and including audio data, image data, and data for error resilience is increased. Thus, a tradeoff occurs as a bit rate occupied by the audio data relatively increases, thus resulting in deterioration in sound quality.

SUMMARY OF THE INVENTION

Accordingly, the present invention has been made in view of the above problems, and it is an object of the present invention to provide a videophone and a videophone system in which, even if the videophone is in a moving state, the videophone communicates with a different videophone at a communicating party's location with sound quality equivalent to that obtained when the videophone is in a stationary or halt state, and in which unnecessary communication with images is suppressed.

According to an aspect of the present invention, a videophone including a videophone unit operable to transmit and receive data including audio and images to and from a different videophone located at a communicating party's location is provided. The videophone includes a movement determining section which determines whether or not the videophone unit is in a moving state, a notifying section which notifies the different videophone of a result of the determination performed by the movement determining section, and a control section which performs control so that, by using the notifying section to notify the different videophone that the videophone unit is in the moving state, the videophone unit receives, from the different videophone, data having an image frame rate lowered less than an image frame rate obtained when the videophone unit is in a stationary state and having an audio error resilience level raised greater than an audio error resilience level obtained when the videophone unit is in the stationary state.

Preferably, the control section performs control so that the videophone unit receives, from the different videophone located at the communicating party's location, as the data having the image frame rate lowered less than the image frame rate obtained when the videophone unit is in the stationary state and having the audio error resilience level raised greater than the audio error resilience level obtained when the videophone unit is in the stationary state, data to which an audio error-correcting code is added.

The control section may perform control so that, in the data having the image frame rate lowered less than the image frame rate obtained when the videophone unit is in the stationary state and the audio error resilience level raised greater than the audio error resilience level obtained when the videophone unit is in the stationary state, an audio bit rate is not lowered less than an audio bit rate obtained when the videophone unit is in the stationary state.

The control section may perform control so that, after a movement state of the videophone unit changes from the moving state to the stationary state, by using the notifying section to notify the different videophone located at the communicating party's location that the videophone unit is in the stationary state, the videophone unit receives, from the different videophone, data including an image frame rate and audio error resilience level changed to values obtained when the videophone unit is in the stationary state.

The control section may perform control so that, when the videophone unit is in the moving state, an image included in the data received from the different videophone located at the communicating party's location is not displayed.

According to another aspect of the present invention, a videophone operable to transmit and receive data including audio and images to and from a different videophone located at a communicating party's location is provided. The videophone includes a communicating-party-videophone-movement determining section which determines whether or not the different videophone is in a moving state, and a control section which performs control so that, when the communicating-party-videophone-movement determining section determines that the different videophone is in the moving state, while transmitting data to the different videophone, an image frame rate is lowered less than an image frame rate obtained when the different videophone is in a stationary state and an audio error resilience level in the transmitting data is raised greater than an audio error resilience level obtained when the different videophone is in the stationary state.

Preferably, by receiving, from the different videophone located at the communicating party's location, a notification indicating that the different videophone is in the moving state, the communicating-party-videophone-movement determining section determines that the different videophone is in the moving state.

The control section may perform control so that the audio error resilience level is raised by adding an audio error-correcting code.

The control section may perform control so that an audio bit rate in the transmitted data is not lowered less than an audio bit rate obtained when the different videophone at the communicating party is in the stationary state.

The control section may perform control so that, when the communicating-party-videophone-movement determining section determines, on the basis of a change in state of the different videophone located at the communicating party's location from the moving state to the stationary state, that the different videophone is in the stationary state, the image frame rate and audio error resilience level in the transmitted data are changed to have values obtained when the different videophone is in the stationary state.

According to another aspect of the present invention, a videophone including a videophone unit operable to transmit and receive data including audio and images to and from a different videophone located at a communicating party's location is provided. The videophone includes a movement determining section which determines whether or not the videophone unit is in a moving state, a notifying section which notifies the different videophone of a result of the determination performed by the movement determining section, a first control section which performs control so that, by using the notifying section to notify the different videophone that the videophone unit is in the moving state, the videophone unit receives, from the different videophone, data having an image frame rate lowered less than an image frame rate obtained when the videophone unit is in a stationary state and an audio error resilience level raised greater than an audio error resilience level obtained when the videophone unit is in the stationary state, a communicating-party-videophone-movement determining section which determines whether or not the different videophone is in a moving state, and a second control section which performs control so that, when the communicating-party-videophone-movement determining section determines that the different videophone is in the moving state, in the data to be transmitted to the different videophone, an image frame rate is lowered less than an image frame rate obtained when the different videophone at the communicating party is in a stationary state and an audio error resilience level is raised greater than an audio error resilience level obtained when the different videophone at the communicating party is in the stationary state.

According to another aspect of the present invention, a videophone transmitting-and-receiving method for transmitting and receiving data including audio and images among a plurality of videophones is provided. The videophone transmitting-and-receiving method includes, by at least one videophone among the plurality of videophones, determining whether or not the at least one videophone is in a moving state, notifying a different videophone located at a communicating party's location of a result of the determination, and, after notifying the different videophone that the at least one videophone is in the moving state, controlling the at least one videophone to receive data having an image frame rate lowered less than an image frame rate obtained when the at least one videophone is in a stationary state and having an audio error resilience level raised than an audio error resilience level obtained when the at least one videophone is in the stationary state.

Preferably, the at least one videophone is controlled to receive from the different videophone located at the communicating party's location, as the data having the image frame rate lowered less than the image frame rate obtained when the at least one videophone unit is in the stationary state and having the audio error resilience level raised greater than the audio error resilience level obtained when the at least one videophone unit is in the stationary state, data to which an audio error-correcting code is added.

The at least one videophone may be controlled so that, in the data having the image frame rate lowered less than the image frame rate obtained when the videophone unit is in the stationary state and having the audio error resilience level raised greater than the audio error resilience level obtained when the videophone unit is in the stationary state, an audio bit rate is not lowered less than an audio bit rate obtained when the at least one videophone is in the stationary state.

After a movement state of the at least one videophone changes from the moving state to the stationary state, by notifying the different videophone located at the communicating party's location that the at least one videophone is in the stationary state, data which has an image frame rate and audio error resilience level changed to have values obtained when the at least one videophone is in the stationary state is received from the different videophone.

When the at least one videophone is in the moving state, an image included in the data received from the different videophone may not be displayed.

According to another aspect of the present invention, a videophone transmitting-and-receiving method for transmitting and receiving data including audio and images among a plurality of videophones is provided. The videophone transmitting-and-receiving method includes, by at least one videophone among the plurality of videophones, determining whether or not a different videophone located at a communicating party's location is in a moving state, and controlling the at least one videophone so that, when it is determined that the different videophone is in the moving state, in the data to be transmitted to the different videophone an image frame rate is lowered less than an image frame rate obtained when the different videophone is in a stationary state and an audio error resilience level is raised greater than an audio error resilience level obtained when the different videophone is in the stationary state.

Preferably, the at least one videophone is controlled so that, by adding an audio error-correcting code, the audio error resilience level in the transmitted data is raised.

The at least one videophone may be controlled so that an audio bit rate in the transmitted data is not lowered less than an audio bit rate obtained when the different videophone is in the stationary state.

The at least one videophone may be controlled so that, when it is determined, on the basis of a change in state of the different videophone from the moving state to the stationary state, that the different videophone is in the stationary state, an image frame rate and audio error resilience level in the transmitted data are changed to have values obtained when the different videophone is in the stationary state.

According to another aspect of the present invention, a videophone system for transmitting and receiving data including audio and images among a plurality of videophones is provided. The videophone system includes a movement determining section which determines whether or not at least one videophone among the plurality of videophones is in a moving state, a notifying section which notifies a different videophone located at a communicating party's location of a result of the determination performed by the movement determining section, a first control section which performs control so that, by using the notifying section to notify the different videophone that the at least one videophone is in the moving state, the at least one videophone receives data having an image frame rate lowered than an image frame rate obtained when the at least one videophone is in a stationary state and having an audio error resilience level raised greater than an audio error resilience level obtained when the at least one videophone is in the stationary state, a communicating-partyvideophone-movement determining section which determines whether or not the different videophone is in a moving state, and a second control section which performs control so that, when the communicating-party-videophone-movement determining section determines that the different videophone is in the moving state, data to be transmitted to the different videophone includes an image frame rate that is lowered less than an image frame rate obtained when the different videophone is in a stationary state and an audio error resilience level is raised greater than an audio error resilience level obtained when the different videophone is in the stationary state.

Preferably, the at least one videophone is provided in a mobile communication terminal.

The at least one videophone may be provided in an on-vehicle navigation apparatus used as a mobile communication terminal.

The at least one videophone may perform simultaneous communication with different videophones at communicating parties' locations.

According to a videophone of the present invention, when the videophone serves as a receiver that receives data including audio and images, even if the videophone is in a moving state, the videophone can communicate with a different videophone located at a communicating party's location with sound quality equivalent to that obtained when the videophone is in a stationary state and unnecessary communication with images can be suppressed when the videophone is in the moving state.

According to a videophone of the present invention, when the videophone serves as a transmitter that transmits data including audio and images, even if a different videophone located at a communicating party's location is in a moving state, a videophone can communicate with the different videophone with sound quality equivalent to that obtained when the different videophone is in a stationary state and unnecessary communication with images can be suppressed when the different videophone is in the moving state.

According to a videophone of the present invention, when the videophone serves both as a receiver and as a transmitter for data including audio and images, even if the videophone or a different videophone located at a communicating party's location is in a moving state, communication can be established between both with sound quality equivalent to that obtained when the videophone or different videophone is in a stationary state and unnecessary communication with images can be suppressed when the videophone or different videophone is in the moving state.

According to a videophone of the present invention, on the basis of notification from a different videophone located at a communicating party's location, it can be easily and reliably determined that the different videophone is in a moving state.

According to a videophone of the present invention, in the videophone, an audio error in data received from a different videophone located at a communicating party's location can be easily and reliably corrected by using an error-correcting code added to the data, whereby communication to the different videophone can be easily and reliably established with good sound quality irrespective of a movement state of the videophone.

According to a videophone of the present invention, an audio error in data transmitted from the videophone can be easily and reliably corrected by using an error-correcting code added to the data in a different videophone located at a communicating party's location, whereby communication to the different videophone can be easily and reliably established with good sound quality irrespective of a movement state of the different videophone at the communicating party's location.

According to a videophone of the present invention, the videophone can receive, from a different videophone located at a communicating party's location, data having a sufficiently reserved audio bit rate in addition to an audio error resilience level, whereby communication with the different videophone can be established with good sound quality irrespective of a movement state of the videophone.

According to a videophone of the present invention, the videophone can transmit, to a different videophone located at a communicating party's location, data having a sufficiently audio bit rate in addition to an audio error resilience level, whereby communication with the different videophone can be established with good sound quality irrespective of a movement state of the different videophone at the communicating party's location.

According to a videophone of the present invention, when the videophone is in a stationary state, the videophone can communicate with a different videophone located at a communicating party's location with good sound quality and good quality images.

According to a videophone of the present invention, when a different videophone located at a communicating party's location is in a stationary state, the videophone can communicate with the different videophone with good sound quality and good quality images.

According to a videophone of the present invention, the videophone can avoid beforehand danger caused by displaying images when the videophone is in a moving state, whereby the videophone can establish secure communication with a different videophone at another location.

According to a videophone of the present invention, when the videophone is provided in a mobile communication terminal and serves as a receiver that receives data including audio and images, even if the videophone is in a moving state, the videophone can communicate with a different videophone located at a communicating party's location with sound quality equivalent to that obtained when the videophone is in a halt state and unnecessary communication with images can be suppressed when the videophone is in the moving state. In addition, when the videophone provided in the mobile communication terminal serves as a transmitter that transmits data including audio and images, even if the different videophone is in a moving state, the videophone provided in the mobile communication terminal can communicate with the different videophone with sound quality equivalent to that obtained when the different videophone is in a stationary state and unnecessary communication with images can be suppressed when the different videophone is in the moving state.

According to a videophone of the present invention, the videophone is provided in an on-vehicle navigation apparatus and serves as a receiver that receives data including audio and images, even if the videophone is in the moving state since a vehicle provided with the videophone is traveling, the videophone can communicate with a different videophone located at a communicating party's location with sound quality equivalent to that obtained when the videophone is in a stationary state and unnecessary communication with images can be suppressed when the videophone is in the moving state. In addition, the videophone provided in the on-vehicle navigation apparatus serves as a transmitter that transmits data including audio and images, even if the different videophone associated with the communicating party is in a moving state, the videophone provided in the on-vehicle navigation apparatus can communicate with the different videophone associated with the communicating party with sound quality equivalent to that obtained when the different videophone located at the communicating party's location is in the stationary state and unnecessary communication with images can be suppressed when the different videophone associated with the communicating party is in the moving state.

According to a videophone of the present invention, when performing simultaneous communication with a plurality of different videophones located at communicating parties' locations, the videophone can have communication with good sound quality irrespective of a movement state of the videophone or each different videophone associated with a communicating party.

According to a videophone system of the present invention, in a case in which at least one videophone serves as a receiver that receives data including audio and images, even if the at least one videophone is in a moving state, a user (hereinafter referred to as "one user") of the at least one videophone can communicate with a communicating party with sound quality equivalent to that obtained when the at least one videophone is in a stationary state and unnecessary communication with images can be suppressed when the at least one videophone is in the moving state.

According to a videophone system of the present invention, when at least one videophone serves as a transmitter that transmits data including audio and images, even if a videophone associated with a communicating party is in a moving state, communication can be established between one user and a communicating party with sound quality equivalent to that obtained when a different videophone associated with a communicating party is in a stationary state and unnecessary communication with images can be suppressed when the different videophone associated with a communicating party is in the moving state.

According to a videophone system of the present invention, when at least one videophone serves both as a receiver and as a transmitter for data including audio and images, even if the at least one videophone or a different videophone located at a communicating party's location is in a moving state, communication can be established between one user and the communicating party with sound quality equivalent to that obtained when the at least one videophone or different videophone is in a stationary state and unnecessary communication with images can be suppressed when the at least one videophone or different videophone is in the moving state.

According to a videophone system of the present invention, on the basis of a notification from a different videophone located at a communicating party's location, it can be easily and reliably determined that the different videophone associated with a communicating party is in the moving state.

According to a videophone system of the present invention, at least one videophone can easily and reliably correct an audio error in data received from a different videophone located at a communicating party's location by using an error-correcting code added to the data, whereby communication with good sound quality can be easily and reliably established between one user and the communicating party irrespective of a movement state of the at least one videophone.

According to a videophone system of the present invention, an audio error in data to be transmitted from the at least one videophone can be easily and reliably corrected by the different videophone located at a communicating party's location, whereby communication with good sound quality can be easily and reliably established between one user and the communicating party irrespective of a movement state of the different videophone associated with the communicating party.

According to a videophone system of the present invention, at least one videophone can receive, in addition to an audio error resilience level, data having a sufficiently reserved audio bit rate, whereby communication with good sound quality can be established between one user and the communicating party irrespective of a movement state of the at least one videophone.

According to a videophone system of the present invention, in addition to an audio error resilience level, data having a sufficiently reserved audio bit rate can be transmitted to a different videophone located at a communicating party's location, whereby communication with good sound quality can be established between one user and the communicating party irrespective of a movement state of the different videophone associated with the communicating party.

According to a videophone system of the present invention, when at least one videophone is in a stationary state, communication with good sound quality and displayed good-quality images can be established between one user and a communicating party.

According to a videophone system of the present invention, when a different videophone associated with a communicating party is in a stationary state, the communicating party can perform communication with one user, the communication having good sound quality and displayed good-quality images.

According to a videophone system of the present invention, danger caused by displaying images when at least one videophone is in a moving state can be avoided beforehand, whereby secure communication can be established between one user and a communicating party.

According to a videophone system of the present invention, when at least one videophone provided in a mobile communication terminal serves as a receiver that receives data including audio and images, even if the at least one videophone is in a moving state, the at least one videophone can communicate with one user with sound quality equivalent to that obtained when the at least one videophone is in a stationary state and unnecessary communication with images can be suppressed when the at least one videophone is in the moving state. In addition, when the at least one videophone provided in the mobile communication terminal serves as a transmitter that transmits data including audio and images, even if a different videophone associated with a communicating party is in a moving state, communication can be established between one user and the communicating party with sound quality equivalent to that obtained when the different videophone associated with the communicating party is in a stationary state and unnecessary communication with images can be suppressed when the different videophone is in the moving state.

Moreover, according to a videophone system of the present invention, when at least one videophone provided in a navigation apparatus serves as a receiver that receives data including audio and images, even if the at least one videophone is in a moving state since a vehicle provided with the at least one videophone is traveling, communication can be established between one user and a communicating party with sound quality equivalent to that obtained when the at least one videophone is in a stationary state and unnecessary communication with images can be suppressed when the at least one videophone is in the moving state. In addition, when the at least one videophone provided in the navigation apparatus serves as a transmitter that transmits data including audio and images, even if the different videophone associated with the communicating party is in the moving state, communication can be established between one user and the communicating party with sound quality equivalent to that obtained when the different videophone associated with the communicating party is in the stationary state and unnecessary communication with images can be suppressed when the different videophone associated with the communicating party is in the moving state.

According to a videophone system of the present invention, even in simultaneous communication with a plurality of different videophones, communication with good sound quality can be established irrespective of a movement state of at least one videophone or each different videophone at each communicating party.

DESCRIPTION OF THE PREFERRED EMBODIMENTS

A videophone 1 and videophone system according to embodiments of the present invention are described below with reference to FIGS. 1 to 5.

Figure 1:
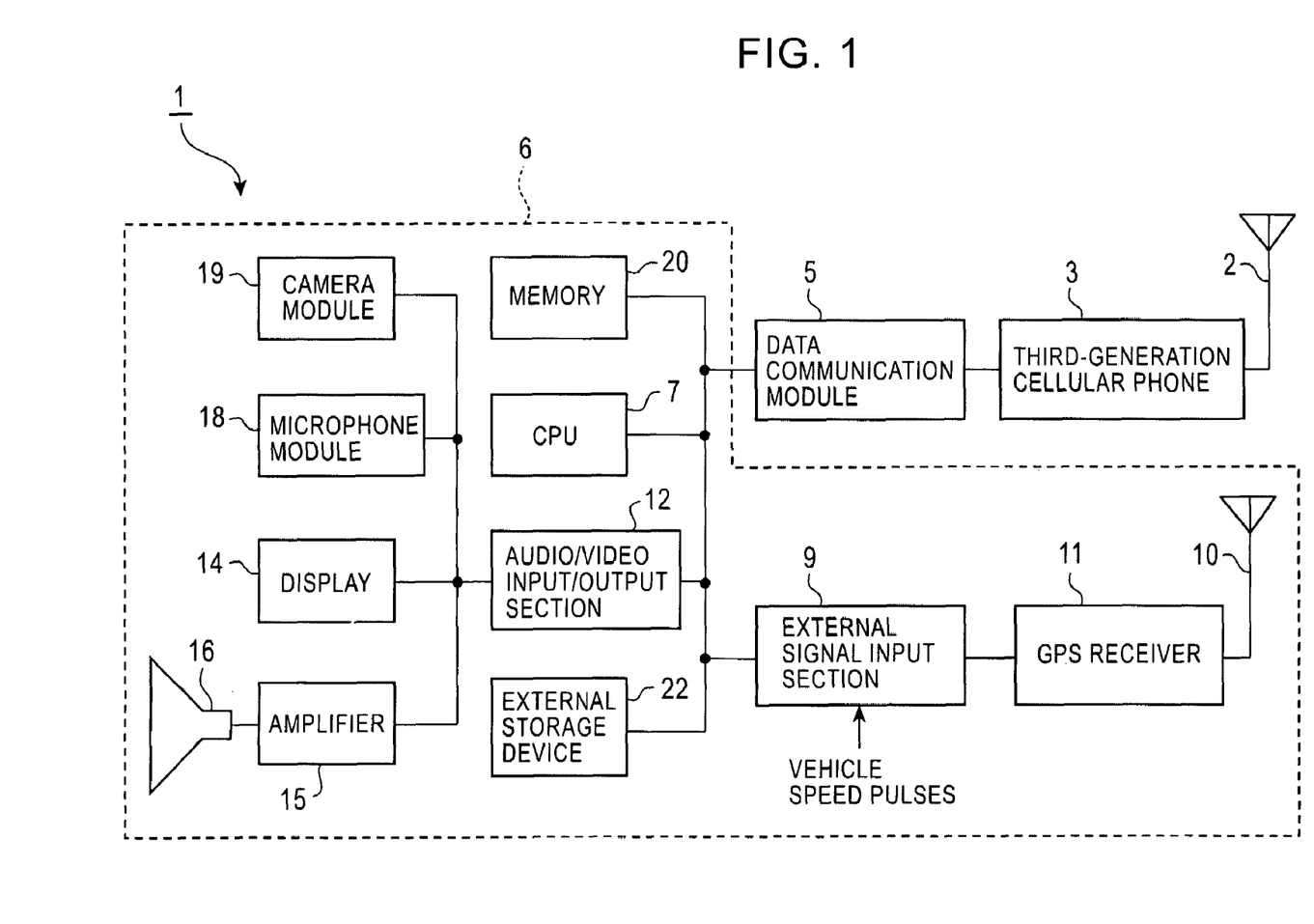
FIG. 1 is a block diagram showing an example of a hardware configuration of a videophone according to an embodiment of the present invention.

FIG. 1 shows, as the videophone 1 according to the embodiment of the present invention, the hardware configuration of an example of a videophone mounted as a mobile communication terminal in an on-vehicle navigation apparatus.

Referring to FIG. 1, the videophone 1 according to the embodiment serves as a videophone unit.

The videophone 1 includes a third-generation cellular phone 3 having an antenna 2. After mutual connection to a different videophone (hereinafter referred to as a "communicating party videophone") (not shown) located at a communicating party's location is established, image data and audio data can be transmitted and received through the antenna 2 between the third-generation cellular phone 3 and the communicating party videophone.

The third-generation cellular phone 3 connects to a data communication module 5, and the data communication module 5 can connect the third-generation cellular phone 3 and a navigation unit 6 so that data communication can be performed between both.

The data communication module 5 connects to a CPU 7 (central processing unit). The CPU 7 performs various types of control for videophone communication between the videophone 1 and the communicating party videophone and navigation by the navigation unit 6.

For example, by separating received data in which audio data (hereinafter referred to as "received audio data") and image data (hereinafter referred to as "received image data") received from the communicating party videophone are multiplexed, the CPU 7 can separately extract the received audio data and the received image data.

In this embodiment, in the received data, not only the received audio data and the received image data, but also data of error resilience in audio is multiplexed.

In the received data, in addition to data of error resilience in audio, data of error resilience in image may be multiplexed.

Also, by multiplexing audio data (hereinafter referred to as "transmitted audio data") and image data (hereinafter referred to as "transmitted image data") to be transmitted from the videophone 1 to the communicating party videophone, the CPU 7 generates multiplexed data, and sends the multiplexed data as transmitted data to the data communication module 5.

At this time, in the transmitted data, not only the transmitted audio data and the transmitted image data, but also data error resilience in audio is multiplexed.

In the transmitted data, in addition to the data error resilience in audio, data of error resilience in image may be multiplexed.

The transmitted data can be sent from the data communication module 5 to the third-generation cellular phone 3, and the third-generation cellular phone 3 can transmit the transmitted data to the communicating party videophone.

Regarding error resilience, when the error resilience is in level 1, an audio stream and an image stream are transferred to the communicating party videophone without being changed. Accordingly, in the case of level 1, the communicating party videophone cannot so much as detect an error. In the case of level 1, assuming that a bit rate of transfer to the communicating party videophone is, for example, 64 kbps (kilobits per second) (constant value), a bit rate occupied by audio is 20 kbps and a bit rate occupied by images is 44 kbps, thus indicating that data of error resilience does not exist (0 kbps).

When the error resilience is in level 2, an error-detecting code (for example, CRC (cyclic redundancy check)) is added to audio and images to be transferred to the communicating party videophone. Accordingly, in the case of level 2, the communicating party videophone can detect an error. In the case of level 2, in a bit rate of 64 kbps of transfer to the communicating party videophone, a bit rate occupied by audio is 20 kbps, a bit rate occupied by images is 40 kbps, and a bit rate occupied by the error-detecting code is 4 kbps.

When the error resilience is in level 3, not only adding an error-detecting code to audio and images to be transferred to the communicating party videophone, an error-correcting code for audio is added. Accordingly, in the case of level 3, after detecting an error in audio, the communicating party videophone can correct the detected error by using the error-correcting code. In the case of level 3, in a bit rate of 64 kbps of transfer to the communicating party videophone, a bit rate occupied by audio is 20 kbps, a bit rate occupied by images is 20 kbps, a bit rate occupied by the error-detecting code is 4 kbps, and a bit rate occupied by the error-correcting code is 20 kbps.

In this embodiment, the CPU 7 functions as a communicating-party-videophone-movement determining section for determining whether or not the communicating party videophone is in a moving state.

In other words, the CPU 7 is notified of a movement state (moving or stationary state) of the communicating party videophone by the communicating party videophone through the third-generation cellular phone 3.

By receiving a notification indicating that the communicating party videophone is in a moving state, the CPU 7 determines that the communicating party videophone is in the moving state.

In this embodiment, the CPU 7 can also function as a control section.

In other words, when the function of the CPU 7 as the communicating-party-videophone-movement determining section determines that the communicating party videophone is in the moving state, the CPU 7 can control transmitting data to be transmitted to the communicating party videophone so that a frame rate of images in transmitted data to be transmitted to the communicating party videophone is lowered less than that obtained when the communicating party videophone is in a stationary state.

The CPU 7 controls an error resilience level of the transmitted data to be raised greater than that obtained when the communicating party videophone is in a stationary state.

Such control of the transmitted data by the CPU 7 is performed in the above-described multiplexing.

This enables control so that, when the communicating party videophone is in the moving state, the function of the CPU 7 as the control section lowers a frame rate of images in transmitted data to be transmitted to the communicating party videophone and an audio error resilience level in the transmitted data is raised greater than that obtained when the communicating party videophone is in the stationary state.

In addition, the notification from the communicating party videophone makes it possible to easily determine that the communicating party videophone is in the moving state.

An input side of the CPU 7 connects to an external signal input section 9, and an input side of the external signal input section 9 connects to a GPS (global positioning system) receiver 11 having an antenna 11. The GPS receiver 11 can receive orbit-and-time information transmitted from a GPS satellite (not shown) and can send the received information as an external signal. The external signal received by the GPS receiver 11 is sent to the external signal input section 9. The external signal input section 9 also receives vehicle speed pulses as an external signal. The external signal input section 9 generates the input external signal and the output external signal is sent to the CPU 7.

In this embodiment, the CPU 7 can also function as a videophone movement determining section.

In other words, on the basis of the external signal sent from the external signal input section 9, the CPU 7 determines whether or not the videophone 1 is in the moving state. In the case of use as an on-vehicle unit, such as the videophone 1 according to the embodiment, determination of whether or not the videophone 1 is in the moving state becomes synonymous with determination of whether or not a vehicle provided with the videophone 1 is in a moving state.

By using a technique (such as releasing a parking brake of the vehicle provided with the videophone 1) other than a technique using the external signal, the CPU 7 may determine whether or not the videophone 1 is in the moving state.

In this embodiment, the CPU 7 can also function as a notifying section.

In other words, the CPU 7 can notify the communicating party videophone through the third-generation cellular phone 3 of the result of the determination obtained by the function of the CPU 7 as the videophone movement determining section.

By using the function of the CPU 7 as the notifying section to notify the communicating party videophone that the videophone 1 is in the moving state, the videophone 1 according to the embodiment can receive, from the communicating party videophone, data in which an image frame rate is lowered less than that obtained when the videophone 1 is in the stationary state and an audio error resilience level is raised greater than that obtained when the videophone 1 is in the stationary state.

This makes it possible to receive, from the communicating party videophone, when the videophone 1 is in the moving state, data in which an image frame rate is lowered less than that obtained when the videophone 1 is in the stationary state and an audio error resilience level is raised greater than that obtained when the videophone 1 is in the stationary state.

In order for the videophone 1 to receive such data from the communicating party videophone, the communicating party videophone also needs to have a function equivalent to that of the above control section.

In addition to the above configuration, in this embodiment, the CPU 7 performs control so that, by using the function of the CPU 7 as the control section to add an audio error-correcting code to the transmitted data, an audio error resilience level is raised.

Accordingly, even if an error in audio occurs in the transmitted data when the communicating party videophone is in the moving state, the communicating party videophone can easily and reliably correct the error by using an audio error-correcting code added to the transmitted data.

In addition to the above-described configuration, the videophone according to the embodiment can receive, from the communicating party videophone, as the received data in which the above image frame rate is lowered and the audio error resilience level is raised, data to which an error-correcting code of audio is added.

Accordingly, even if an error of audio occurs in the data received from the communicating party videophone when the videophone 1 is in the moving state, the error can be easily and reliably corrected by using an audio error-correcting code added to the received data.

In order for the videophone 1 to receive the above data from the communicating party videophone, similarly to the CPU 7, the communicating party videophone also needs to have a function in which, by receiving, from the videophone 1, notification indicating that that the videophone 1 is in the moving state, data to be transmitted to the videophone 1 is controlled to become data to which an audio error-correcting code is added.

In addition to the above configuration, the CPU 7 performs control so that, by using the function of the CPU 7 as the control section, an audio bit rate in data to be transmitted to the communicating party videophone is not lowered less than that obtained when the communicating party videophone is in the stationary state.

This makes it possible to control data to be transmitted to the communicating party videophone so that a bit rate occupied by audio is sufficiently reserved and the audio error resilience level is raised.

At this time, regarding setting the audio bit rate to be equal to that obtained when the communicating party videophone is in the stationary state, or raising the audio bit rate greater than that obtained when the communicating party videophone is in the stationary state, either may be selected depending on the concept.

In addition to the above configuration, the videophone 1 according to the embodiment can receive, from the communicating party videophone, as the received data in which the above image frame rate is lowered and the audio error resilience level is raised, data in which an audio bit rate is not lowered less than that obtained when the videophone 1 is in the stationary state.

This enables the videophone 1 to receive, from the communicating party videophone, data in which a bit rate occupied by audio is sufficiently reserved and an audio error resilience level is raised.

In order for the videophone 1 to receive the above data, the communicating party videophone also needs to control transmitted data to be transmitted to the videophone 1 so that an audio bit rate is not lowered.

In addition, after a movement state of the communicating party videophone changes from the moving state to the stationary state, on the basis of notification of the change through the third-generation cellular phone 3 from the communicating party videophone, the CPU 7 functions as the communicating-party-videophone-movement determining section to determine that the communicating party videophone is in the stationary state.

When the CPU determines that the communicating party videophone is in the stationary state, the CPU 7 performs control so that the CPU 7 functions as the control section to change the image frame rate and audio error resilience level in the transmitted data (to be transmitted to the communicating party videophone) to those obtained when the communicating party videophone is in the stationary state.

Accordingly, when the movement state of the communicating party videophone changes from the moving state to the stationary state, the CPU 7 performs control so that the CPU 7 functions as the control section to change the image frame rate and audio error resilience level in the transmitted data (to be transmitted to the communicating party videophone) to those obtained when the communicating party videophone is in the stationary state.

In addition, in this embodiment, when the movement state of the videophone 1 changes from the moving state to the stationary state, the change is determined by the function of the CPU 7 as the videophone movement determining section, and the CPU 7 functions as the notifying section to notify the communicating party videophone that the videophone 1 is in the stationary state.

On the basis of this notification, the videophone 1 can receive, from the communicating party videophone, data in which an image frame rate and audio error resilience level are changed to those obtained when the videophone 1 is in the stationary state.

Accordingly, when the movement state of the videophone 1 changes from the moving state to the stationary state, the videophone 1 can receive, from the communicating party videophone, data in which image frame rate and audio error resilience level are changed to those obtained when the videophone 1 is in the stationary state.

In order for the videophone 1 to receive such data from the communicating party videophone, similarly to the CPU 7, the communicating party videophone needs to perform control so that, after receiving, from the videophone 1, the notification indicating that the videophone 1 is in the stationary state, an image frame rate and audio error resilience level in transmitted data to be transmitted to the videophone 1 are changed to those obtained when the videophone 1 is in the stationary state.

In addition, in this embodiment, when the videophone 1 is in the moving state, the CPU 7 performs control so that images included in the data received from the communicating party videophone are not displayed.

This can avoid beforehand danger caused by displaying images when the videophone 1 is in the moving state.

The CPU 7 connects to an audio/video input/output unit 12, and the received audio data and received image data separated by the CPU 7 are sent to the audio/video input/output unit 12.

Under the control of the CPU 7, the audio/video input/output unit 12 decodes the received audio data and received image data, and relays the decoded audio data and image data.

A display 14 is connected to a received-image-data output side of the audio/video input/output unit 12, and the decoded image data produced by the audio/video input/output unit 12 is sent to the display 14.

The display 14 can display the received image data on its screen.

This allows the display 14 to display images of the communicating party when the videophone 1 (the vehicle) is in the stationary state.

An amplifier 15 is connected to a received-audio-data-output side of the audio/video input/output unit 12, and an output side of the amplifier 15 connects to a speaker 16.

The received audio data decoded by the audio/video input/output unit 12 can be sent to the amplifier 15. The amplifier 15 performs power amplification on the received audio data and sends the amplified data to the speaker 16.

The speaker 16 can produce audio output based on the audio data generated by the amplifier 15. This makes it possible to hear speech of the communicating party from the speaker 16.

A microphone module 18 connects to a transmitting-audio-data input side of the audio/video input/output unit 12. The microphone module 18 can convert a sound input by speech of a user of the videophone 1 into transmitting-audio data.

The transmitting-audio data produced by the microphone module 18 is sent to the audio/video input/output unit 12. Under the control of the CPU 7, the audio/video input/output unit 12 encodes the transmitting-audio data and generates the encoded transmitting-audio data.

A camera module 19 is connected to a transmitting-image-data input side of the audio/video input/output unit 12. After converting images captured by the user into transmitting-image data, the camera module 19 can produce the transmitting-image data.

The transmitting-image data generated by the camera module 19 is sent to the audio/video input/output unit 12. The transmitting-image data is encoded and relayed by the audio/video input/output unit 12.

After the encoded transmitting-audio data and transmitting-image data produced from the audio/video input/output unit 12 are multiplexed as described above by the CPU 7, the multiplexed data is transmitted to the communicating party videophone.

Accordingly, the speech of the user of the videophone 1 can be heard by the communicating party videophone and images of the user of the videophone 1 can be displayed by the communicating party videophone when it is in the stationary state.

The CPU 7 connects to a memory 20 and the memory 20 stores software that the CPU 7 executes.

By executing the software stored in the memory 20, the memory 20 can realize the above functions as the notifying section, the videophone movement determining section, and transmitting-data control unit, and, in addition, the various types of control required for videophone communication.

Details of the software stored in the memory 20 are described later.

The videophone 1 has functions of a common navigation apparatus.

In other words, the CPU 7 can determine the present position of the vehicle provided with the videophone 1 on the basis of an external signal sent from the external signal input section 9, and can calculate a route from the determined present position of the vehicle to a destination set by an input operation on a touch panel of the display 14, or the like.

The CPU 7 connects to an external storage device 22 such as a hard disk, and the external storage device 22 stores a map database.

By referring to road data stored in the map database when route calculation is performed, the CPU 7 can calculate a recommended route to the destination.

Also, by using the map data read from the map database, the CPU 7 can create map-display data and can send the created map-display data to the display 14 through the audio/video input/output unit 12.

This allows the display 14 to display a map on its screen when navigation is executed.

In addition, the CPU 7 can create guidance-image data for guiding the vehicle along the recommended route to the destination which is calculated in the route calculation, and can send the created guidance-image data to the display 14 through the audio/video input/output unit 12.

This makes it possible to display guidance images, such as an enlarged image of an intersection and a lane guidance image, if needed, on the screen of the display 14 when navigation is executed.

The CPU 7 can also create audio-guidance data for guiding the vehicle along the recommended route to the destination which is calculated by the route calculation, and can send the created audio-guidance data to the speaker 16 through the audio/video input/output unit 12 and the amplifier 15.

This makes it possible to use the speaker 16 to provide audio guidance such as intersection right-turn/left-turn guidance, if needed, when navigation is executed.

Figure 2:
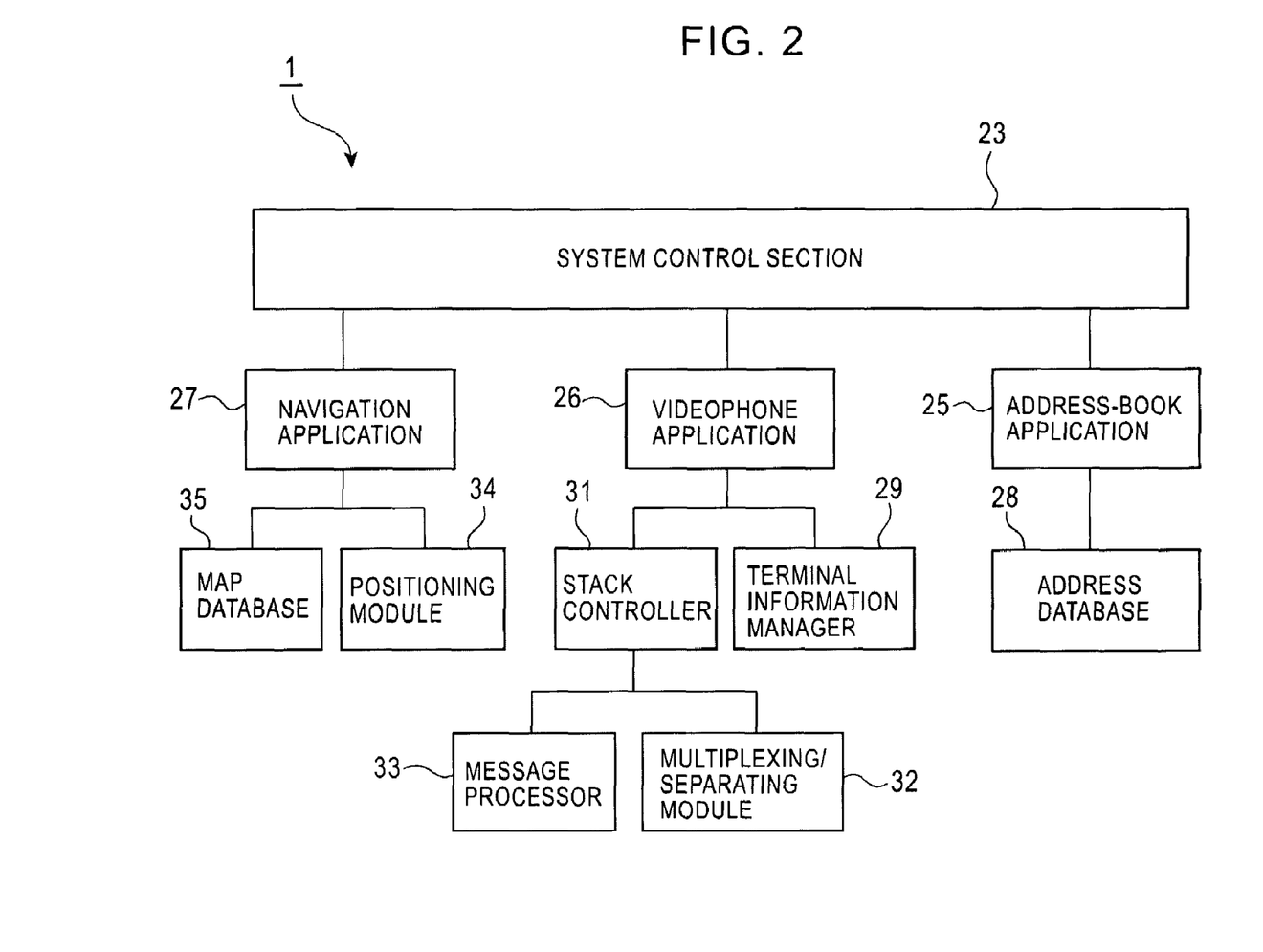
FIG. 2 is a block diagram showing a software configuration of the videophone according to the embodiment of the present invention.

Next, FIG. 2 is a block diagram showing a software configuration stored in the memory 20 in the videophone 1 shown in FIG. 1. As shown in FIG. 2, the videophone 1 includes a system control section 23 for overall control of the entire system of the videophone 1. The system control section 23 can be executed by the CPU 7.

The videophone 1 has, as lower level software for the system control section 23, an address-book application 25, a videophone application 26, and a navigation application 27.

Obviously, the address-book application 25 and the videophone application 26 may be those read and acquired from the third-generation cellular phone 3.

At a level lower than the address-book application 25, an address database 28 is provided. Data, such as telephone numbers and user names corresponding to the telephone numbers, is read and written from/to the address database 28 such that the CPU 7 uses the system control section 23 to execute the address-book application 25.

At a level lower than the videophone application 26, a terminal information manager 29 is provided. Data is read/written from/to the terminal information manager 29 such that the CPU 7 uses the system control section 23 to execute the terminal information manager 29. In the terminal information manager 29, capability information (such as CODEC capability and multiplexing table) that is acquired by capability information exchange in, for example, mutual connection to the communicating party videophone, may be set.

At a level lower than the videophone application 26, a stack controller 31 is provided. At a level lower than the stack controller 31, a multiplexing/separating module 32 and a message processor 33 are provided.

The stack controller 31 can operate the multiplexing/separating module 32 and message processor 33 as software lower in level than the stack controller 31 in such a manner that the CPU 7 uses the system control section 23 to execute the videophone application 26.

The multiplexing/separating module 32 can set the multiplexing table required for the above-described data multiplexing and separation.

Depending on the movement state of the communicating party videophone, the multiplexing/separating module 32 can control an image frame rate and error resilience level in the transmitting data to the communicating party videophone.

The message processor 33 can control the audio/video input/output unit 12 so that the audio data and the image data are encoded or decoded in accordance with a predetermined encoding or decoding method.

At a level lower than the navigation application 27, a positioning module 34 and a map database 35 are provided.

The positioning module 34 determines the present position of the vehicle provided with the videophone 1 in such a manner that the CPU 7 uses the system control section 23 to execute the navigation application 27.

Map data is read from the map database 35 in such a manner that the CPU 7 uses the system control section 23 to execute the navigation application 27. The map database 35 may be one read from the external storage device 22.

The videophone 1 according to the embodiment and the communicating party videophone, which is similar in configuration to the videophone 1, constitute a videophone system according to an embodiment of the present invention.

Next, an operation of the videophone system according to the embodiment of the present invention that is constituted by the videophone 1 having the above-described configuration and the communicating party videophone, which is similar in configuration to the videophone 1, is described below.

To use the videophone system according to the embodiment to start communication between the videophone 1 and the communicating party videophone, the videophone 1 selects the telephone number of the communicating party videophone which is recorded in the address database 28, and makes a call to the communicating party videophone.

An operation for making the call may be performed by, for example, an input operation with the touch panel of the display 14, an input operation by speech with the microphone module 18, or an input operation with the third-generation cellular phone 3.

Figure 3:
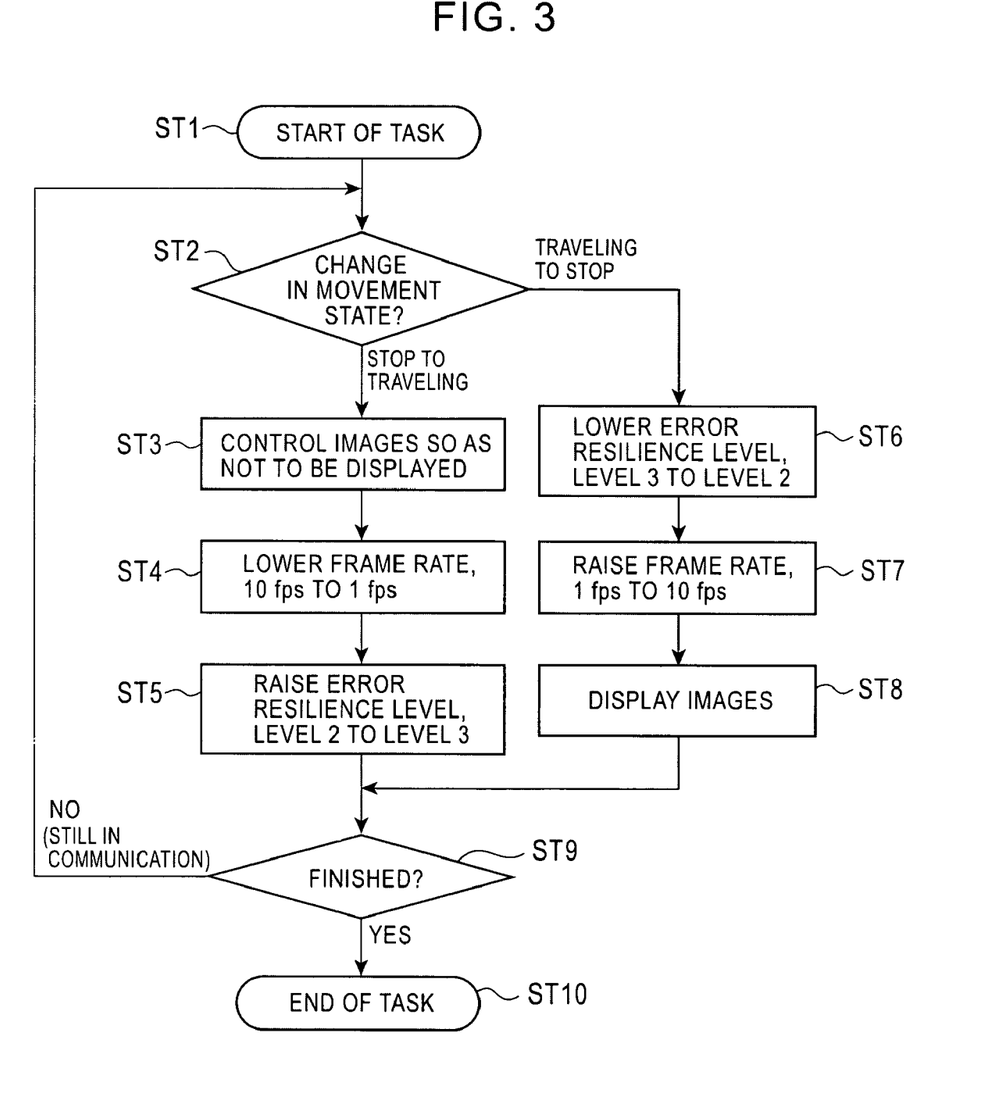
FIG. 3 is a flowchart showing an operation of a videophone system according to an embodiment of the present invention.

After making the call to the communicating party videophone, capability information exchange is performed and mutual connection to the communicating party videophone is subsequently performed, whereby the videophone 1 and the communicating party videophone enter a communicating state, and, as shown in step ST1 of FIG. 3, a communicating state task is started.

In step ST1, speech and images of the user of the videophone 1 are transmitted to the communicating party videophone through the third-generation cellular phone 3.

Specifically, the speech of the user of the videophone 1 is converted by the microphone module 18 into transmitting-audio data, and the transmitting-audio data is encoded by the audio/video input/output unit 12.

Also, the images of the user of the videophone 1 are converted by the camera module 19 into transmitting-image data, and the transmitting-image data is encoded by the audio/video input/output unit 12.

The encoded transmitting-audio data and transmitting-image data, and, in addition, the data for error resilience are multiplexed by the CPU 7.

At this time, on the basis of whether or not to have received notification indicating that the communicating party videophone is in the moving state, the CPU 7 determines the movement state of the communicating party videophone, as is not shown.

The CPU 7 sets the image frame rate and error resilience level to different values depending on the movement state of the communicating party videophone.

Specifically, the vehicle provided with the communicating party videophone is traveling, the CPU 7 sets the image frame rate to 1 fps (frames per second), and sets the error resilience level to level 3 in which the above error-detecting code and error-correcting code are added.

Conversely, the vehicle provided with the communicating party videophone is at a stop, the CPU 7 sets the image frame rate to 10 fps, and sets the error resilience level to 2 fps in which only the above error-detecting code is added.

Transmit data multiplexed in one of the multiplexing patterns is transmitted to the communicating party videophone through the third-generation cellular phone 3 after passing through the data communication module 5.

In step ST1, data is received from the communicating party videophone through the third-generation cellular phone 3, and the received data is separated by the CPU 7 into received audio data and received image data.

At this time, depending on the error resilience level of the received data, an error generated in audio or image of the received data is detected, corrected, or received in unchanged form.

The received audio data is decoded by the audio/video input/output unit 12, and the decoded audio data is sent to the speaker 16 after being amplified by the amplifier 15. This makes it possible for the user of the videophone 1 to hear, by the speaker 16, speech of the communicating party as the user of the communicating party videophone.

After the received image data is decoded by the audio/video input/output unit 12, the decoded image data is sent to the display 14. This displays the images of the communicating party on the display 14.

The above processing is performed, whereby, in step ST1, videophone communication is performed between the user of the videophone 1 and the communicating party.

In step ST2, on the basis of whether to have received notification from the communicating party videophone, the function of the CPU 7 as the movement determining section determines the movement state of the communicating party videophone, that is, whether or not the vehicle provided with the communicating party videophone has changed from a stop to traveling, or whether the vehicle provided with the communicating party videophone has changed from traveling to a stop.

If, in step ST2, it is determined that the vehicle provided with the communicating party videophone has changed from a stop to traveling, the process proceeds to step ST3. If, in step ST2, it is determined that the vehicle provided with the communicating party videophone has changed from traveling to a stop, the process proceeds to step ST6.

In step ST3, the CPU 7 performs control so that the received image data is not displayed, and, after the displayed images are erased, the process proceeds to step ST4.

In step ST4, the function of the CPU 7 as the control section performs processing that lowers the image frame rate of the transmitted data from 10 fps in step ST1 to 1 fps, and the process proceeds to step ST5.

In step ST5, the function of the CPU 7 as the control section performs processing that raises the error resilience level of the transmitted data from level 2 in step ST1 to level 3, and the process proceeds to step ST9.

Figure 4:
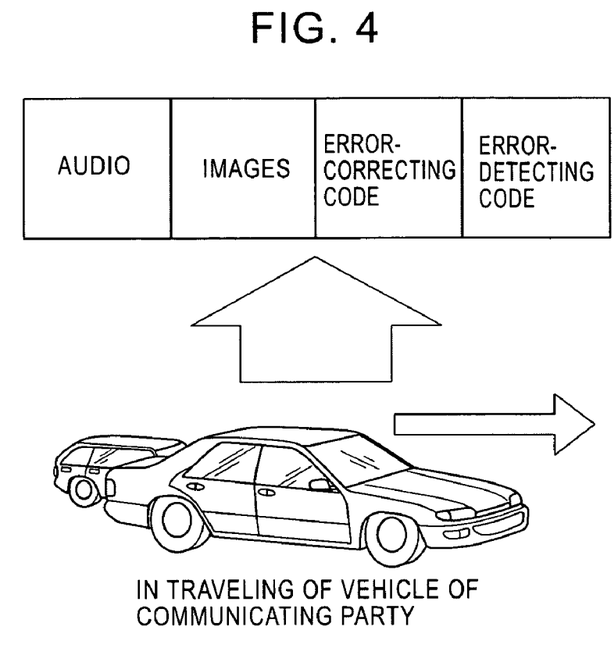
FIG. 4 is an illustration of the contents of data to be transmitted to a different videophone located at a communicating party's location in the videophone system according to the embodiment, and a movement state of a vehicle provided with the different videophone.

As shown in FIG. 4, processing from steps ST2 to ST5 enables the videophone 1 to transmit, to the communicating party videophone, transmitted data to which an audio error resilience level is added and in which the audio error resilience level is preferentially handled over images that are not actually displayed.

Accordingly, even if an error occurs in audio in the transmitting data, the communicating party videophone can easily and reliably correct the error by using an error-correcting code on the basis of the transmitted data transmitted from the videophone 1.

As a result, the user of the videophone 1 and the communicating party can communicate with each other by using audio having good sound quality.

In addition, in step ST6, the function of the CPU 7 as the control section performs processing that lowers the error resilience level of the transmitting data from level 3 in step ST1 to level 2. The process proceeds to step ST7.

In step ST7, the function of the CPU 7 as the control section performs processing that raises the image frame rate of the transmitting data from 1 fps in step ST1 to 10 fps.

Figure 5:
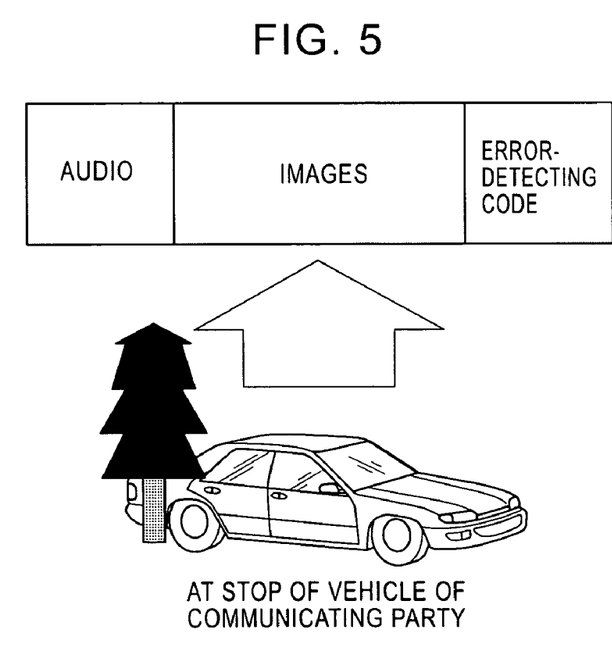
FIG. 5 is an illustration of the contents of data to be transmitted to a different videophone located at a communicating party's location in the videophone system according to the embodiment, and a stationary state of a vehicle provided with the different videophone.

Processing from steps ST6 to ST7 enables the videophone 1 to transmit, to the communicating party videophone, a transmitted signal in which the image frame rate is lowered less than that in step ST1 and in which adding only an error-detecting code lowers the error resilience level less than that in step ST1, as shown in FIG. 5.

This allows the communicating party videophone to display images of the user of the videophone 1 in step ST8 following step ST7 on the basis of the transmitted data transmitted from the videophone 1.

In step ST9 following step ST5 or ST8, the CPU 7 determines whether or not the communication has finished. If the communication has finished, the process proceeds to step ST10 and finishes the communicating state task. If it is determined that the communication is still being performed, the process returns to step ST2.

In addition, in the communicating party videophone, processing similar to steps ST1 to ST10 can be performed.

In this manner, the transmitted data, transmitted from the communicating party videophone to the videophone 1, that is, the image frame rate and error resilience level of the data received by the videophone 1 from the communicating party videophone, are controlled to differ depending on the movement state of (the vehicle provided with) the videophone 1.

As a result, the user of the videophone 1 and the communicating party can communicate with each other by using audio having good sound quality irrespective of the movement state of the videophone 1.

As described above, according to the videophone 1 and the videophone system according to the embodiments, in a case in which the videophone 1 serves as each of a receiving side for receiving data including audio and images and a transmitting side for transmitting the data, even if one of the videophone 1 and the communicating party videophone is in the moving state, communication with sound quality equivalent to that obtained in the stationary state can be performed between the user of the videophone 1 and the communicating party.

In addition, according to the present invention, communication with unnecessary images can be suppressed while the videophone 1 or the communicating party videophone is in the moving state.

The present invention is not limited to the above-described embodiments and may be variously modified, if needed.

For example, simultaneous communication may be performed among a plurality of communicating party videophones. In this case, depending on the movement state of the videophone 1 or the communicating party videophone, the image frame rate and error resilience level can be controlled to preferable values between the videophone 1 and each of the communicating party videophones, whereby simultaneous communication can be performed with audio having good sound quality.

In addition, the present invention is effectively applicable to mobile communication terminals, such as cellular phones, other than on-vehicle navigation apparatuses.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A videophone including a videophone unit operable to transmit and receive data including audio and images to and from a different videophone, the videophone comprising:
   a movement determining section operable to determine whether the videophone unit is moving;
   a notifying section operable to notify the different videophone located at a communicating party's location of a result of the determination performed by the movement determining section; and
   a control section operable to direct that, when the notifying section notifies the different videophone that the videophone unit is moving, the videophone unit receives from the different videophone data having an image frame rate lowered less than an image frame rate obtained when the videophone unit is stationary and also having an audio error resilience level raised greater than an audio error resilience level obtained when the videophone unit is stationary.

2. The videophone according to claim 1, wherein the control section is operable to direct that the videophone unit receives from the different videophone data, such as the data having the image frame rate lowered less than the image frame rate obtained when the videophone unit is stationary and having the audio error resilience level raised greater than the audio error resilience level obtained when the videophone unit is stationary, to which an audio error-correcting code is added.

3. The videophone according to claim 1, wherein the control section is operable to direct that, in the data having the image frame rate lowered less than the image frame rate obtained when the videophone unit is stationary and having the audio error resilience level raised greater than the audio error resilience level obtained when the videophone unit is stationary, an audio bit rate is not lowered to less than an audio bit rate obtained when the videophone unit is stationary.

4. The videophone according to claim 1, wherein the control section is operable to direct that, after a movement state of the videophone unit changes from moving to stationary, the notifying section notifies the different videophone that the videophone unit is stationary and the videophone unit receives from the different videophone data having an image frame rate and audio error resilience level changed to values obtained when the videophone unit is stationary.

5. The videophone according to claim 4, wherein the control section is operable to direct that an image included in the data received from the different videophone is not displayed when the videophone unit is moving.

6. A videophone operable to transmit and receive data including audio and images to and from a different videophone, the videophone comprising:
   a communicating-party-videophone-movement determining section operable to determine whether or not the different videophone located at a communicating party's location is moving; and
   a control section operable to direct that, when the communicating-party-videophone-movement determining section determines that the different videophone is moving, data transmitted to the different videophone has an image frame rate that is lowered less than an image frame rate obtained when the different videophone is stationary and an audio error resilience level in the transmitted data is raised greater than an audio error resilience level obtained when the different videophone is stationary.

7. The videophone according to claim 6, wherein, by receiving from the different videophone a notification indicating that the different videophone is moving, the communicating-party-videophone-movement determining section determines that the different videophone is moving.

8. The videophone according to claim 6, wherein the control section is operable to direct that the audio error resilience level in data to be transmitted is raised by adding an audio error-correcting code.

9. The videophone according to claim 6, wherein the control section is operable to direct that an audio bit rate in the transmitted data is not lowered less than an audio bit rate obtained when the different videophone is stationary.

10. The videophone according to claim 6, wherein the control section is operable to direct that the image frame rate and audio error resilience level in the transmitted data are changed to have values obtained when the different videophone is stationary when the communicating-party-videophone-movement determining section determines, on the basis of a change in state of the different videophone from moving to stationary, that the different videophone is stationary.

11. A videophone including a videophone unit operable to transmit and receive data including audio and images to and from a different videophone, the videophone comprising:
   a movement determining section operable to determine whether or not the videophone unit is moving;
   a notifying section operable to notify the different videophone located at a communicating party's location of a result of the determination performed by the movement determining section;
   a first control section operable to direct that, after the notifying section notifies the different videophone that the videophone unit is moving, the videophone unit receives from the different videophone data having an image frame rate lowered less than an image frame rate obtained when the videophone unit is stationary and an audio error resilience level raised greater than an audio error resilience level obtained when the videophone unit is stationary;
   a communicating-party-videophone-movement determining section operable to determine whether or not the different videophone is moving; and
   a second control section operable to direct that, when the communicating-party-videophone-movement determining section determines that the different videophone is moving, in data to be transmitted to the different videophone, an image frame rate is lowered less than an image frame rate obtained when the different videophone is stationary and an audio error resilience level is raised greater than an audio error resilience level obtained when the different videophone is stationary.

12. A videophone transmitting-and-receiving method for transmitting and receiving data including audio and images among a plurality of videophones, the videophone transmitting-and-receiving method comprising:
   determining whether or not at least one videophone among the plurality of videophones is moving;
   notifying a different videophone other than the at least one videophone of a result of the determination; and
   by notifying the different videophone that the at least one videophone is moving, controlling the at least one videophone to receive data having an image frame rate lowered less than an image frame rate obtained when the at least one videophone is stationary and having an audio error resilience level raised greater than an audio error resilience level obtained when the at least one videophone is stationary.

13. The videophone transmitting-and-receiving method according to claim 12, wherein the at least one videophone is controlled to receive from the different videophone data to which an audio error-correcting code is added along with the data having the image frame rate lowered less than the image frame rate obtained when the at least one videophone unit is stationary and having the audio error resilience level raised greater than the audio error resilience level obtained when the at least one videophone unit is stationary.

14. The videophone transmitting-and-receiving method according to claim 12, wherein the at least one videophone is controlled so that, in the data having the image frame rate lowered less than the image frame rate obtained when the videophone unit is stationary and having the audio error resilience level raised greater than the audio error resilience level obtained when the videophone unit is stationary, an audio bit rate is not lowered less than an audio bit rate obtained when the at least one videophone is stationary.

15. The videophone transmitting-and-receiving method according to claim 12, wherein, after a movement state of the at least one videophone changes from moving to stationary, by notifying the different videophone that the at least one videophone is stationary, data which has an image frame rate and audio error resilience level changed to have values obtained when the at least one videophone is stationary is received from the different videophone.

16. The videophone transmitting-and-receiving method according to claim 15, wherein, when the at least one videophone is moving, an image included in the data received from the different videophone is not displayed.

17. A videophone transmitting-and-receiving method for transmitting and receiving data including audio and images among a plurality of videophones, the videophone transmitting-and-receiving method comprising:
   determining via at least one videophone among the plurality of videophones whether or not a different videophone associated with a communicating party is moving; and
   controlling the at least one videophone so that, when it is determined that the different videophone is moving, in data to be transmitted to the different videophone, an image frame rate is lowered less than an image frame rate obtained when the different videophone is stationary and an audio error resilience level is raised greater than an audio error resilience level obtained when the different videophone is stationary.

18. The videophone transmitting-and-receiving method according to claim 17, wherein the at least one videophone is controlled so that, by adding an audio error-correcting code, the audio error resilience level in the transmitted data is raised.

19. The videophone transmitting-and-receiving method according to claim 17, wherein the at least one videophone is controlled so that an audio bit rate in the transmitted data is not lowered less than an audio bit rate obtained when the different videophone is stationary.

20. The videophone transmitting-and-receiving method according to claim 17, wherein the at least one videophone is controlled so that, when it is determined, on the basis of a change in state of the different videophone from moving to stationary, that the different videophone is stationary, an image frame rate and audio error resilience level in the transmitted data are changed to have values obtained when the different videophone is stationary.

21. A videophone system operable to transmit and receive data including audio and images among a plurality of videophones, the videophone system comprising:
   a movement determining section operable to determine whether or not at least one videophone among the plurality of videophones is moving;
   a notifying section operable to notify a different videophone other than the at least one videophone of a result of the determination performed by the movement determining section;
   a first control section operable to direct that, when the notifying section notifies the different videophone that the at least one videophone is moving, the at least one videophone receives data having an image frame rate lowered less than an image frame rate obtained when the at least one videophone is stationary and having an audio error resilience level raised greater than an audio error resilience level obtained when the at least one videophone is stationary;
   a communicating-party-videophone-movement determining section operable to determine whether or not the different videophone is moving; and
   a second control section operable to direct that, when the communicating-party-videophone-movement determining section determines that the different videophone is moving, in data to be transmitted to the different videophone, an image frame rate is lowered less than an image frame rate obtained when the different videophone is stationary and an audio error resilience level is raised greater than an audio error resilience level obtained when the different videophone is stationary.

22. The videophone system according to claim 21, wherein the at least one videophone is provided in a mobile communication terminal.

23. The videophone system according to claim 21, wherein the at least one videophone is provided in an on-vehicle navigation apparatus used as a mobile communication terminal.

24. The videophone system according to claim 21, wherein the at least one videophone performs simultaneous communication with different videophones associated with different communicating parties.

* * * * *